United States Patent [19]

Groothoff

[11] Patent Number: 5,066,322

[45] Date of Patent: Nov. 19, 1991

[54] METALLIC COOLANT FOR A METALLURGICAL BATH

[75] Inventor: Jan A. Groothoff, Aerdenhout, Netherlands

[73] Assignee: Heckett Holland B.V., Ijmuiden, Netherlands

[21] Appl. No.: 534,304

[22] Filed: Jun. 7, 1990

Related U.S. Application Data

[63] Continuation of Ser. No. 289,020, Dec. 23, 1988, abandoned.

[30] Foreign Application Priority Data

Jan. 18, 1988 [NL] Netherlands .......................... 8800095

[51] Int. Cl.$^5$ ................................................ B22F 1/00
[52] U.S. Cl. ....................................... 75/255; 102/704
[58] Field of Search ............................. 75/53, 251, 255; 102/704

[56] References Cited

U.S. PATENT DOCUMENTS 3,434,669  3/1969  Giambattista ................... 241/100 X

FOREIGN PATENT DOCUMENTS 1151717  7/1963  Fed. Rep. of Germany .
2753052  6/1978  Fed. Rep. of Germany .
870342  6/1961  United Kingdom .

OTHER PUBLICATIONS

H. McGannon, "The Making, Shaping and Treating of Steel", 9th edition, 1971, pp. 254–255.
N. Townsend, "A Review of Recent Developments in Scrap Preparation", 1972, pp. 649–655.
Stahl and Eisen 107 (1987) No. 2, pp. 54–58.

*Primary Examiner*—Timothy V. Eley
*Attorney, Agent, or Firm*—Stevens, Davis, Miller & Mosher

[57] ABSTRACT

A metallic coolant for a metallurgical bath, the composition of the coolant substantially corresponding to that of the bath consists of ball-shaped bodies of sizes not less than 5 mm and not more than 60 mm, preferably 12 to 60 mm, the ball-shape factor B of the coolant having a value of at least 0.57. The ball shape factor (herein defined) relates the shape to that of spherical balls. The coolant can be made, using a hammer mill, from scrap.

5 Claims, No Drawings

METALLIC COOLANT FOR A METALLURGICAL BATH

This application is a continuation of application Ser. No. 289,020, filed Dec. 23, 1988, now abandoned.

BACKGROUND OF THE INVENTION

1. Field of the Invention

The invention relates to a metallic coolant for a metallurgical bath, the composition of the coolant essentially corresponding to that of the bath. The invention also relates to a method of cooling a metallurgical bath using the coolant and to a method of manufacture of the coolant. Finally the invention also provides a use of a further coolant produced in this method of manufacture, in continuous casting.

2. Description of the Prior Art

In metallurgical processes the desired composition of the metal bath is often reached at a temperature which is higher than the temperature at which the metal is to be processed further or at which the liquid metal is to be cast. So in order to achieve the desired temperature, a coolant is fed into the bath in a quantity which corresponds with the desired fall in temperature.

Various demands are made on the coolant, such as:

Its composition must be known and lie between the desired limits so that it corresponds adequately with the composition limits of the bath, in order to prevent the compositional analysis of this bath altering undesirably.

The coolant must have an adequately high dispensed weight to prevent any undesired inclusions.

The dimensions of the coolant particles must lie between set limits so that the coolant is sufficiently manageable.

The coolant must be capable of being dosed smoothly and of being dispensed accurately.

The coolant must be as free as possible from grease, dust, oxide and clinging dirt.

Often shredded metal scrap is used as coolant, for example for steel baths. The scrap may or may not be greatly or slightly deformed in order to make it more manageable.

However, it has been found that there is a need for a metallic coolant which can be dispensed faster and more accurately and has a more dependable cooling effect. For the last requirement it can be noted that if the coolant contains too many small parts, then there is a risk that these stay floating on the bath and provide insufficient cooling effect. On the other hand one of the drawbacks of metal scrap of over-large sizes is that they can block off feed systems which may then become clogged and be unable to be used. This means that other additions essential to the process may not be added to the bath, the bath will not reach the correct composition and the charge will have to be downgraded. Here it should be noted that the dimensions of the feed system have to be kept limited in the case where the coolant is supplied to an installation of which the bath is treated under vacuum, thereby increasing the susceptibility of the installation to clogging.

SUMMARY OF THE INVENTION

The object of the invention is to provide a metallic coolant which avoids or mitigates the drawbacks mentioned.

The coolant of the invention mainly consists of ball-shaped bodies of sizes between 5 and 60 mm, preferably between 12 and 60 mm, the ball-shape factor B (as defined below) of the coolant bodies having a value of at least 0.57. The body size mentioned is the sieve pass size of the bodies, not their average size.

The ball-shape factor B is the quotient (ratio) between (a) the occupied volume per unit of bulk volume of the bodies of the coolant when poured, and (b) the occupied volume per unit of bulk volume of spherical balls of one size when poured. The unoccupied volume is thus the total void space between the poured bodies (or balls). The bodies (or balls) are poured so as to achieve a random, not settled, packing. It has been found that the factor B is a measure of the closeness of the coolant bodies and at the same time of the flow behaviour and the suitability for accurate dispensing of the coolant. A value for B of more than 0.57 is found to be necessary to keep the coolant free from unduly large openings. Moreover, it has been found that at such values the coolant may be dispensed very accurately and flows extremely regularly and reproducibly from bunker outlets.

Good results are particularly obtainable with a factor B of between 0.60 and 0.65.

If the coolant consists of an ultra-low carbon steel, (e.g. steel below 0.1% C., preferably below 0.05% C.) it is found that a good approximation of ball shape is possible. For such material a dispensing weight of between 3.5 and 4.0 ton/m$^3$ has been found to be achievable. Good results are in this case, and generally, obtained in a conventional steel-making plant with a steel coolant with a ball-shape factor having a value of between 0.58 and 0.62 in combination with coolant body sizes between 20 and 60 mm.

It is to be noted that the metallic coolant of the invention described may be used not only for steel baths but also for temperature control of, for example, aluminium baths. Then preferably at least low alloy aluminium quality should be taken as a starting material.

The coolant of the invention consists to at least 50% by weight of the said ball-shaped bodies of sizes between 5 and 60 mm, preferably at least 75%. The coolant may consist substantially entirely of said bodies.

The invention also provides a method of cooling a metallurgical bath by adding the coolant to the bath. Within the invention, the coolant is added to the bath simultaneously with, e.g. in admixture with, other material.

Although various ways may be conceived for giving steel elements sufficient density and an adequate ball-shape approximation, it has been found that one of these methods leads to an inexpensive and reproducible production process. The invention in this aspect consists in that strip or bar shaped steel waste or scrap, which may be pre-cut, is processed a plurality of times in a hammer mill with an anvil grid of square grid holes of size in the range 30 to 70 mm, preferably about 50×50 mm in size, in which during hammering the hammer mill is kept filled to a level of at least 85% of the mill volume (i.e. volume available for material being milled). In practice the extent to which the mill is filled can be controlled by measuring the power used by the hammer mill drive means and keeping the hammer mill filled to a level of at least 90% of the peak power capacity of the nominal drive means of the mill. Hammer mills with grids of the type mentioned are in general known (see for example, DE-B-1 151 717). Indeed these are also used to reduce and somewhat compact sheet shaped metal scrap, of which, however, up to now approximately ball-shaped elements have not been obtained of the required density and with the required ball-shape factor. It has even been found that when processing strip shaped cut waste a large portion of the material disappears through the grid holes in strip shapes or in the shape of shavings, from which a hammered material is obtained which cannot be dispensed sufficiently accurately and pours irregularly.

It has been found that, if the hammering is repeated a plurality of times under the condition described above, an entirely satisfactory product can be obtained. Surprisingly, this material also becomes completely free of clinging grease, dirt residue and oxide. For this it is essential that the mill be kept filled to an adequate level. If the load level of the mill is less, it is found that even on repeated hammering a significant portion of the load may be insufficiently compacted. The number of hammering treatments is at least two, preferably three.

A further refinement of the new method consists in that the hammered material being is sieved after every processing in the hammer mill for the removal of fine material, and that after at least the second (preferably the third) processing it is sieved to select the desired bodies of sizes between 12 and 60 mm. The fine material consists of particles with sizes in the order of magnitude from 1–12 mm which during hammering tend to be rubbed off from the scrap. On final selection, it is possible to select the coolant within narrower size limits, if this is desired. However, for the bulk of applications is has been found that coolant body sizes between 12 and 60 mm, preferably 12 and 50 mm, produce an entirely satisfactory result.

In another aspect of the invention, a use has been found for one fraction of the fine material (under 12 mm) sieved out during the manufacture of the coolant, as described above. Thus in this manufacturing process, it is preferred that said fine material removed by sieving is further sieved into fractions of sizes (a) under 2 mm (b) between 2 and 5 mm and optionally (c) between 5 and 12 mm. The fraction (b)—2 to 5 mm sized particles—is, according to the invention, used in the continuous casting of steel to cool a dummy bar by application to the surface of the dummy bar which contacts the liquid steel, of a coolant comprising the said frction (b).

In the start up of continuous casting machines for steel, the so-called dummy bar is used for supporting the liquid steel in the mould and for gradually transporting the solidifying steel from the mould. This dummy bar is made from steel and it is essential that provision is made to prevent the molten steel welding to the dummy bar, since the dummy bar must be eliminated from the machine after start up of the casting machine. The dummy bar should remain intact for further multiple use. It has been found that by covering the liquid-facing surface of the dummy bar, before the casting begins, with a layer of the granular fraction (b) described above of between 2 and 5 mm a suitable cooling is achieved which prevents the said welding of liquid steel to the dummy bar head.

The function (c) is very suitable for use as an additive or catalyst in the chemical process industry or as a feedstock in a sintering plant. The fraction (a) has proved to be particularly suitable for use in a mini-mill (low capacity steel plant), or in a vacuum ladle treatment plant for steel, or as a feedstock for an iron foundry plant.

For the manufacture of the above-mentioned coolant of the invention with a ball-shape factor between 0.58 and 0.62 in combination with sizes between 20 and 60 mm, it has been found useful to start with sheet shaped material of appropriate composition with a thickness of between 1 and 12 mm, preferably 1 to 8 mm. This material can have surface dimensions, i.e. size, not exceeding $1.2 \times 0.5$ m, for example $0.5 \times 1$ m.

It has already been mentioned that it is important in the manufacturing method that the hammer mill should remain well filled. This can be achieved by providing the hammer mill with an automatic supply system which is activated if the effective power taken becomes less than 90% of the peak capacity of the drive means.

Hammer mills typically have a drum on a drive axle and around its circumference the drum carries a plurality of axles on which hammer heads swing. When the drum is rotating the hammer heads swing along the anvil. It has been found that the method in accordance with the invention can be influenced by the way the hammer mill is configured and the way it is driven. In particular it has been found that it is preferable to provide the hammer axles with at least 18 hammers per 10 square meters of drum surface, and that the mill is driven at approximately 600 revolutions per minute, i.e. between 550 and 650 rpm. It is to be noted that as a rule it is possible with hammer mills to vary the number of hammers per hammer axle, and in many cases it is preferable not to equip the hammer axles fully with hammers. In the case of the present method, however, as a rule the hammer axles should be fully equipped with hammers.

DESCRIPTION OF THE PREFERRED EXAMPLE

To give one example of the invention, good results were achieved when using a hammer mill made by the firm Lindemann, model "Zerdirator". This mill is driven with 14 hammers per 7.7 square meter of drum surface. Six hammer axles are fitted into the drum at a radius from the drive axle of 57.5 cm. The mill is driven at a speed of 585 revolutions per minute. The anvil has grid apertures of about $50 \times 50$ mm. The filling level is maintained at a level corresponding to over 90% of the rated peak power capacity of the drive of the mill. Under these conditions the mill volume enclosed between the drum and the anvil grid is filled to an adequate level.

The starting steel material used was cut material which originated from side trimmings in a hot strip mill. The thickness of this material varied between approximately 2 and 12 mm, while the edge shearings were cut into lengths of approximately 10 to 20 cm.

Under the conditions described a good coolant could be obtained with this having a ball-shape factor B of approximately 0.63 and a dispensing weight which varied between 3.6 and 3.8 ton/m$^3$.

As a result of the heat generated during the hammering and the processing of the material in the mill, the coolant was completely free from grease, dirt and mill scale.

I claim:
1. Metallic coolant for use with a metallurgical bath in which the chemical composition of the metallurgical bath substantially corresponds to the chemical composition of the coolant, said coolant being selected from the group consisting of metallic steel and aluminum ball-shaped metallic bodies of sizes not less than 5 mm and not more than 60 mm, the ball-shape factor B of the coolant having a value of at least 0.57.

2. Metallic coolant according to claim 1 wherein said ball-shaped bodies are of sizes not less than 12 mm and not more than 60 mm.

3. Metallic coolant according to claim 1 wherein $0.60 \leq B \leq 0.65$.

4. Metallic coolant according to claim 1 wherein the coolant is made of ultra-low carbon steel and has a weight when poured in the range of 3.5 to 4.0 ton/m$^3$.

5. Metallic coolant according to claim 1 wherein $0.58 \leq B \leq 0.62$ and the ball-shaped bodies are of sizes not less than 20 mm and not more than 60 mm.

* * * * *